(12) United States Patent
Wang et al.

(10) Patent No.: US 8,149,513 B2
(45) Date of Patent: Apr. 3, 2012

(54) PACKAGE STRUCTURE OF LIQUID LENS

(75) Inventors: Pei-Jen Wang, Hsinchu (TW);
Jer-Liang Andrew Yeh, Taichung (TW)

(73) Assignee: National Tsing Hua University (TW)

( * ) Notice: Subject to any disclaimer, the term of this patent is extended or adjusted under 35 U.S.C. 154(b) by 319 days.

(21) Appl. No.: 12/318,447

(22) Filed: Dec. 30, 2008

(65) Prior Publication Data

US 2010/0079873 A1    Apr. 1, 2010

(30) Foreign Application Priority Data

Sep. 26, 2008  (TW) ............................. 97137146 A

(51) Int. Cl.
*G02B 3/14*    (2006.01)
(52) U.S. Cl. ....................................... 359/666; 359/665
(58) Field of Classification Search ........... 359/665–667
See application file for complete search history.

(56) References Cited

U.S. PATENT DOCUMENTS

| | | | | |
|---|---|---|---|---|
| 2,759,117 A * | 8/1956 | Hasbrouck | ..................... | 313/439 |
| 3,900,328 A * | 8/1975 | Parsons et al. | ................... | 501/11 |
| 4,289,379 A * | 9/1981 | Michelet | ........................ | 359/666 |
| 6,891,679 B2 * | 5/2005 | Atarashi et al. | ................ | 359/666 |
| 7,936,520 B2 * | 5/2011 | Yeh | ................................ | 359/666 |
| 2007/0002455 A1 | 1/2007 | Berge et al. | | |
| 2008/0030870 A1 * | 2/2008 | Bruno et al. | ................... | 359/666 |
| 2008/0231965 A1 * | 9/2008 | Weekamp | ..................... | 359/666 |

* cited by examiner

*Primary Examiner* — Ricky Mack
*Assistant Examiner* — Zachary Wilkes
(74) *Attorney, Agent, or Firm* — Thomas, Kayden, Horstemeyer & Risley, LLP.

(57) ABSTRACT

The invention discloses a package structure of a liquid lens which includes a first substrate and an electrode on the first substrate. The package structure includes a second substrate, a first sleeve, a second sleeve, a first circular member, and a second circular member. The first substrate is fixed at the first sleeve to form a holding chamber for receiving a first dielectric liquid and a second dielectric liquid. The second substrate is disposed on the liquid lens and fixed at the second sleeve. The first sleeve is fixedly connected inside the first sleeve and the second substrate. The second circular member is disposed on the first circular member. The first and second circular member are located and urged between the first sleeve and the second sleeve to form a reserved expansion chamber.

12 Claims, 2 Drawing Sheets

PACKAGE STRUCTURE OF LIQUID LENS

BACKGROUND OF THE INVENTION

1. Field of the Invention

The present invention relates to a package structure. More particularly, the invention relates to a package structure of a liquid lens.

2. Description of the Prior Art

The liquid lens refers to a lens having an adjustable focal length. Generally, the liquid lens can be one lens apparatus employing the mechanism of electro-wetting or one lens apparatus employing the mechanism of interfacial dielectric forces.

Please refer to FIG. 1. FIG. 1 illustrates a cross-sectional view of a traditional electro-wetting type liquid lens 60 disclosed in TW. Patent No. 200706917 (also US Patent Pub. No. 2007/0002455). As shown in FIG. 1, the liquid lens 60 has an expansion chamber 70 on its side, and the expansion chamber 70 is connected with a channel 74 to receive the overflowing liquid caused from the thermal expansion of the filled liquid chamber 61 inside the liquid lens 60. However, the expansion chamber 70 set aside will affect the optical design and the overall package assembly of the liquid lens unit; hence, it requires to be improved. Furthermore, being restricted to the operational principle of the electro-wetting type liquid lens, the package casing of the liquid lens 60 in FIG. 1 needs to be made of metal or electrically conducting materials, and thus the choice of the casing material is limited.

In addition, because each of the coefficients of thermal expansion for both lens liquids is larger than the casing materials, certain conventional package structure for traditional liquid lenses still exhibit the problem of liquid leakage when stored or operated under variations of environmental temperature.

Therefore, to solve the aforementioned problem, the main scope of the invention is to provide a package structure for a liquid lens.

SUMMARY OF THE INVENTION

One scope of the invention is to provide a package structure of a liquid lens. The liquid lens includes a first substrate, an insulating layer, an electrode structure, a first dielectric liquid and a second dielectric liquid. Wherein, the electrode structure is formed on the first substrate, and the insulating layer overlays the electrode structure.

According to an embodiment of the invention, the package structure includes a second substrate, a first sleeve, a second sleeve, a first circular member, a second circular member and a liquid-sealing material.

The first substrate of the liquid lens is fixed at the first sleeve to form a holding chamber for receiving the first dielectric liquid and the second dielectric liquid of the liquid lens. The second substrate is disposed on the liquid lens and fixed at the second sleeve. Besides, the first sleeve is fixedly connected inside the second sleeve and the second substrate. The second circular member is disposed on the first circular member. Moreover, the first and the second circular member are located and urged between the first sleeve and the second sleeve to form a reserved expansion chamber. The liquid-sealing material is for encapsulation of a bottom gap between the first sleeve and the second sleeve, including the area adjacent to the bottom gap.

The advantage and essence of the invention may be comprehended by the following recitations together with the appended drawings.

BRIEF DESCRIPTION OF THE APPENDED DRAWINGS

DETAILED DESCRIPTION OF THE INVENTION

Figure 1:
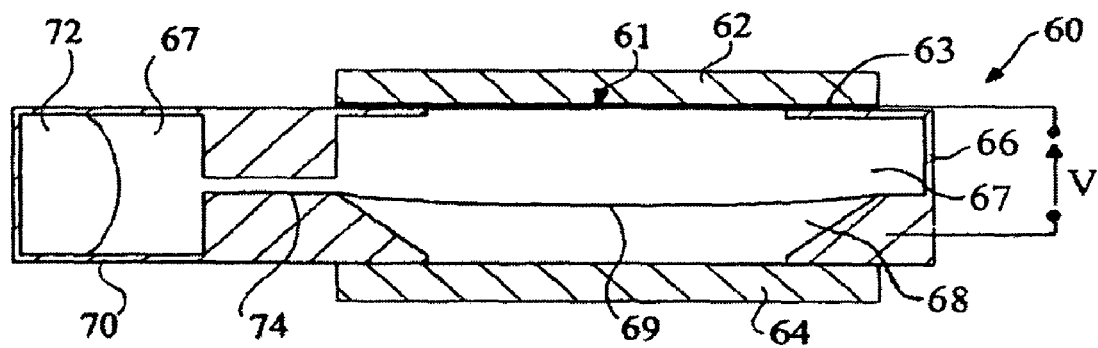
FIG. 1 illustrates a cross-sectional view of a traditional electro-wetting type liquid lens.
Figure 2:
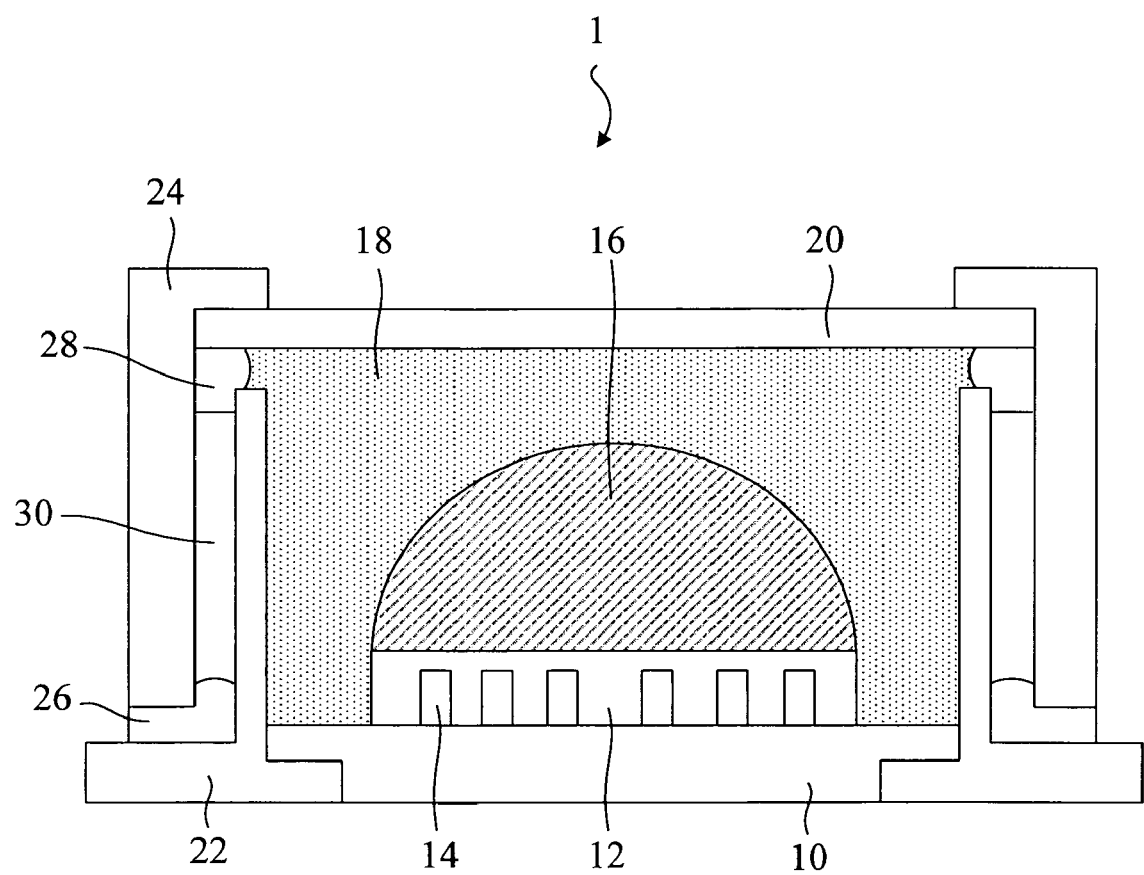
FIG. 2 illustrates a cross-sectional view of a package structure of a liquid lens according to an embodiment of the invention.

Please refer to FIG. 2. FIG. 2 illustrates a cross-sectional view of a package structure of a liquid lens 1 according to an embodiment of the invention.

As shown in FIG. 2, the liquid lens 1 includes a first substrate 10, an insulating layer 12, an electrode structure 14, a first dielectric liquid 16 and a second dielectric liquid 18. Wherein, the electrode structure 14 is formed on the first substrate 10, and the insulating layer 12 overlays the electrode structure 14.

It should be explained that the liquid lens 1 has an adjustable focal length, which is realized by selectively electric-biasing the electrode structure 14. In detail, each electrode can be supplied by a distinct electric bias-voltage. By varying a potential between the first dielectric liquid 16 and each electrode, the contact angle of the first dielectric liquid 16 is adjustable. In other words, the focal length of the liquid lens 1 is adjusted by controlling the strength and distribution of the electric field and utilizing the change in dielectric forces. In practical applications, the first substrate 10 can be made of an inorganic glass material or an optical polymer material.

The package structure according to the invention includes a second substrate 20, a first sleeve 22, a second sleeve 24, a first circular member 26, a second circular member 28 and a liquid-sealing material (not shown in FIG. 2). In practical applications, each of the first sleeve 22 and the second sleeve 24 can be made of a metallic material, a polymeric material, or a composite material. In addition, each of the first sleeve 22 and the second sleeve 24 can be formed by an injection-molding process or a metal-machining process.

As shown in FIG. 2, after fabricating the electrode structure 14 by semiconductor manufacturing processes, such as the film deposition, the development and the etching process on the first substrate 10, the first substrate 10 is fixed at the first sleeve 22 to form a holding chamber for receiving the first dielectric liquid 16 and the second dielectric liquid 18 of the liquid lens 1. Besides, a connecting circuit can be formed on the first substrate 10, and the electrode structure 14 is electrically connected to an external driving circuit through the connecting circuit to control the electric field between the first dielectric liquid 16 and the electrode structure 14 to vary the focal length of the liquid lens 1.

The second substrate 20 is disposed on the liquid lens 1 and fixed at the second sleeve 24. Besides, the first sleeve 22 is fixedly connected inside the second sleeve 24 and the second substrate 20. In practical applications, the second substrate 20 can be made of an inorganic glass material or an optical polymer material. Moreover, the second substrate 20 can be formed by an injection-molding process, a polishing process or a glass-molding process. Practically, the first sleeve 22 and the second sleeve 24 can be configured to have fixing holes adapted to fixing members, e.g. screws, to mount the first substrate 10 and the second substrate 20 together. Optionally, the first sleeve 22 and the second sleeve 24 can be chemically bonded to the first substrate 10 and the second substrate 20, respectively. Otherwise, the first substrate 10 and the first sleeve 22 are monolithically molded; the second substrate 20 and the second sleeve 24 are monolithically molded as well.

It should be noted that before the first sleeve 22 is inserted into the second sleeve 24, the first circular member 26 can be disposed around the bottom of the first sleeve 22, and the second circular member 28 can be disposed around the top of the first sleeve 22. Thus, after the first sleeve 22 is inserted into the second sleeve 24, the first and the second circular member 28 are located and urged between the first sleeve 22 and the second sleeve 24. Thereby, a reserved expansion chamber 30 is formed and enclosed by the first sleeve 22, the second sleeve 24, the first circular member 26 and the second circular member 28. It is noticed that the dimension of the reserved expansion chamber 30 can be determined based on the thermodynamic properties of the dielectric liquids, such as thermal expansion coefficients.

Although the volume of each of the dielectric liquids will expand when the environmental temperature rises, the reserved expansion chamber 30 can receive the overflowing dielectric liquids from the holding chamber. Accordingly, the reserved expansion chamber 30 avoids the problem of liquid leakage effectively.

In practical applications, each of the first circular member 26 and the second circular member 28 can be made of a deformable material. Optionally, each of the first circular member 26 and the second circular member 28 can be made of a thermosetting material or a thermoplastic material, e.g. fluorine rubber or silicone. Further, after the first sleeve 22 is inserted into the second sleeve 24, the liquid-sealing material can be used to encapsulate a bottom gap between the first sleeve 22 and the second sleeve 24, even the area adjacent to the bottom gap, which prevents external contaminants from seeping into the package structure and polluting the lens.

Functionally, the second circular member 28 can be used to avoid the liquid leakage between the first sleeve 22 and the second sleeve 24. Additionally, the volume of each of the dielectric liquids will expand and exert pressure upon the first sleeve 22 when the environmental temperature rises, which may deform the first sleeve 22. Nevertheless, because each of the first circular member 26 and the second circular member 28 is made of a deformable material, the pressure induced from the volume expansions of the dielectric liquids can be relieved. Therefore, even though the environmental temperature changes, the focal length of the liquid lens 1 still can be controlled by externally applied voltages, and the problem of liquid leakage can be circumvented.

To sum up the aforesaid descriptions, the package structure of the liquid lens according to the invention not only has an excellent sealing property, but also overcomes the traditional problem of liquid leakage caused by the volume expansions of the dielectric liquids due to variations of the environmental temperature.

With the example and explanations above, the features and essence of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A liquid lens system comprising:
a liquid lens comprising:
a first substrate having an upper surface;
an electrode structure formed on the upper surface of the first substrate, capable of supplying an electric field; and
an insulating layer, formed on the upper surface of the first substrate, the insulating layer thereof providing an optical axis orientating structure, wherein a first dielectric liquid is disposed on the optical axis orientating structure, and a second dielectric liquid is filled within said liquid lens;
a first sleeve, the first substrate of the liquid lens being fixed at the first sleeve to form a holding chamber for receiving the first dielectric liquid and the second dielectric liquid;
a second sleeve;
a second substrate disposed on the liquid lens and fixed at the second sleeve, the first sleeve being fixedly connected inside the second sleeve and the second substrate;
a first circular member;
a second circular member, disposed on the first circular member, the first and the second circular member being located and urged between the first sleeve and the second sleeve to form a reserved expansion chamber; and
a gap being encapsulated between the first sleeve and the second sleeve;
wherein the optical axis orientating structure is a platform that is comprised of an edge to confine the first dielectric liquid, and the platform covers a part of the upper surface of the first substrate.

2. The liquid lens system of claim 1, wherein each of the first sleeve and the second sleeve is made of a metal material, a polymer material, or a composite material.

3. The liquid lens system of claim 2, wherein each of the first sleeve and the second sleeve is formed by an injection-molding process or a metal-machining process.

4. The liquid lens system of claim 1, wherein the first substrate is made of an inorganic glass material or an optical polymer material.

5. The liquid lens system of claim 1, wherein the first substrate and the first sleeve are monolithically molded.

6. The liquid lens system of claim 1, wherein a connecting circuit is formed on the first substrate, and the electrode structure is electrically connected to an external driving circuit through the connecting circuit.

7. The liquid lens system of claim 1, wherein the second substrate is made of an inorganic glass material or an optical polymer material.

8. The liquid lens system of claim 1, wherein the second substrate is formed by an injection-molding process, a polishing process or a glass-molding process.

9. The liquid lens system of claim 8, wherein the second substrate and the second sleeve are monolithically molded.

10. The liquid lens system of claim 1, wherein each of the first circular member and the second circular member is made of a deformable material.

11. The liquid lens system of claim 1, wherein each of the first circular member and the second circular member is made of a thermosetting material or a thermoplastic material.

12. The liquid lens system of claim 11, wherein each of the first circular member and the second circular member is made of a fluorine rubber or a silicone.

* * * * *